Nov. 6, 1951     F. S. LAPEYRE ET AL     2,574,044
SHRIMP PEELING MACHINE

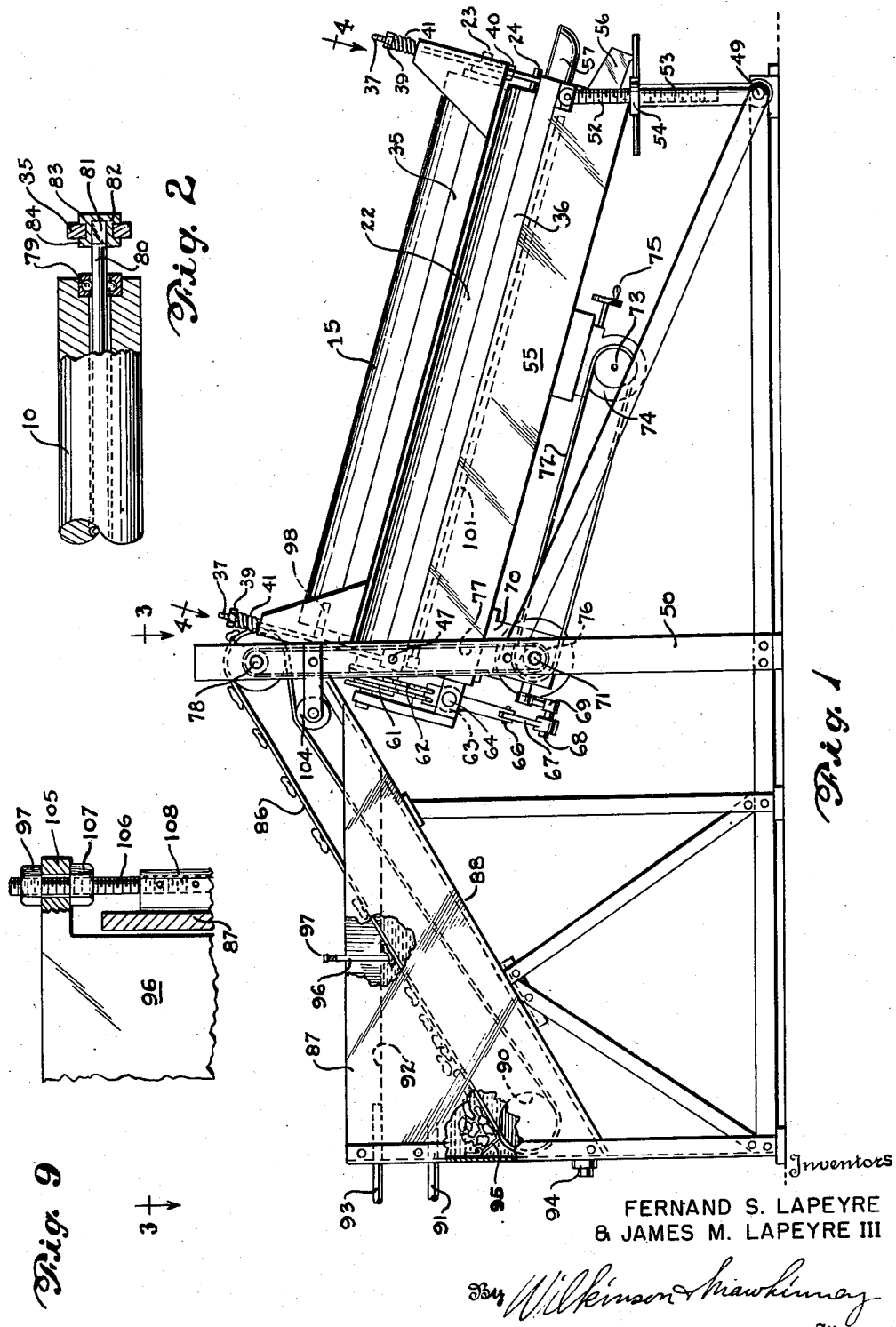

Filed April 1, 1946                          5 Sheets-Sheet 2

Inventors
FERNAND S. LAPEYRE
& JAMES M. LAPEYRE III

Nov. 6, 1951  F. S. LAPEYRE ET AL  2,574,044
SHRIMP PEELING MACHINE
Filed April 1, 1946  5 Sheets-Sheet 3
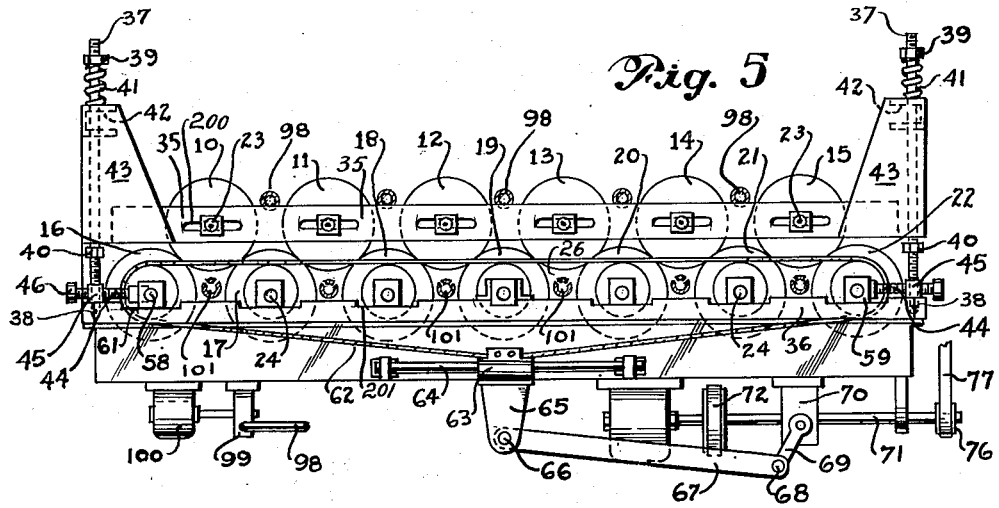
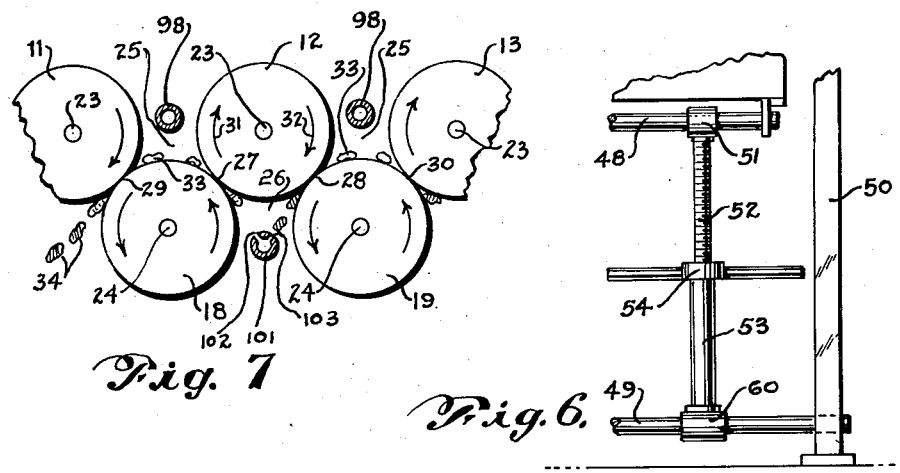
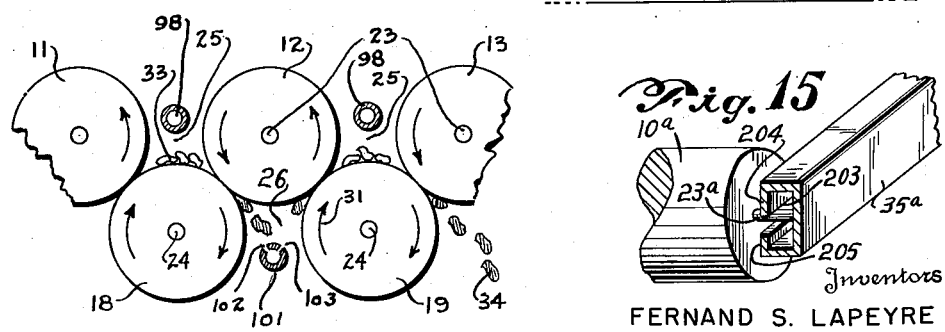
INVENTORS
FERNAND S. LAPEYRE
& JAMES M. LAPEYRE III
By Wilkinson & Mawhinney
Attorneys Nov. 6, 1951     F. S. LAPEYRE ET AL     2,574,044
SHRIMP PEELING MACHINE
Filed April 1, 1946     5 Sheets-Sheet 4
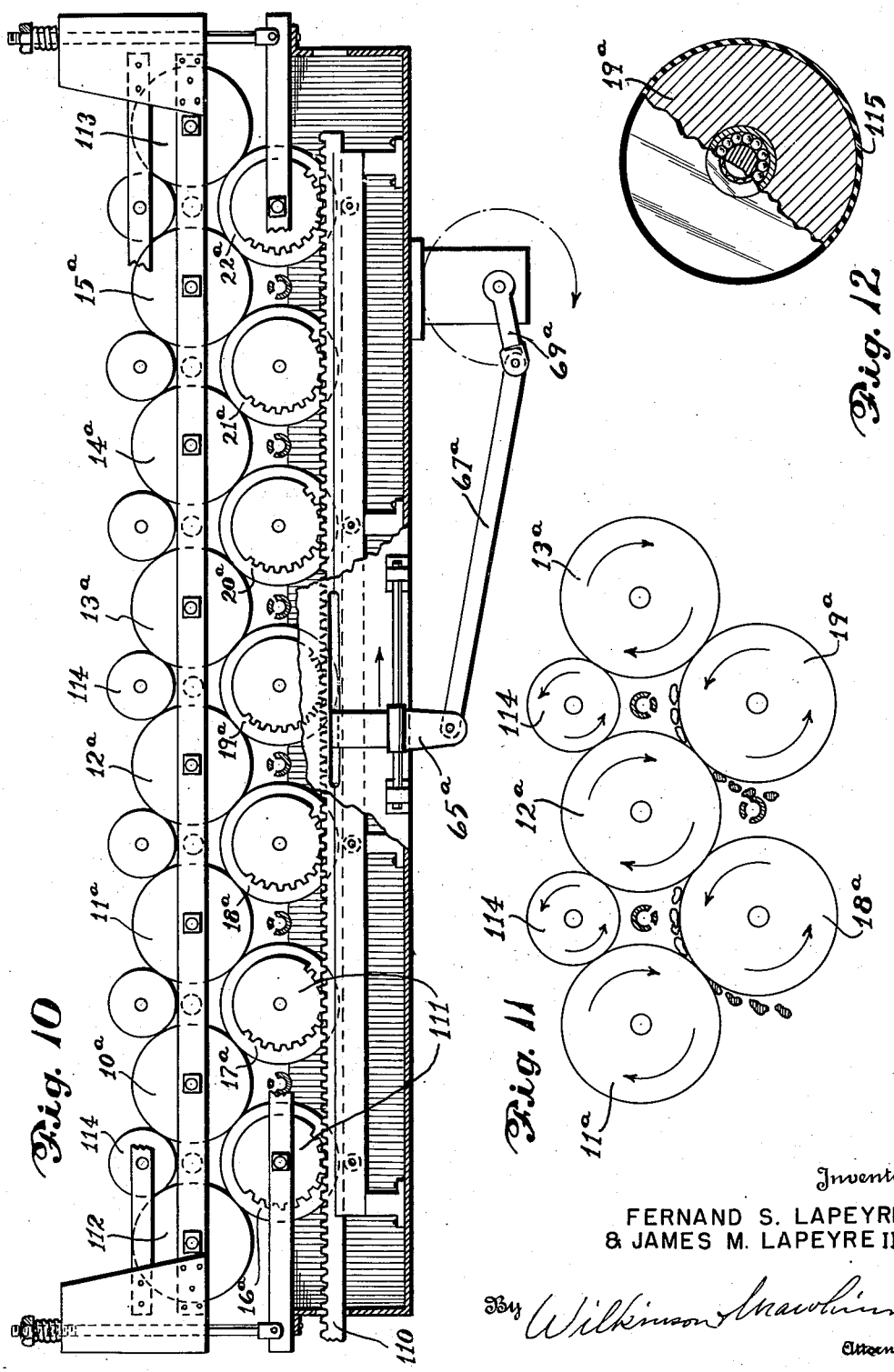
Inventors
FERNAND S. LAPEYRE
& JAMES M. LAPEYRE III Nov. 6, 1951　　F. S. LAPEYRE ET AL　　2,574,044
SHRIMP PEELING MACHINE
Filed April 1, 1946　　5 Sheets-Sheet 5
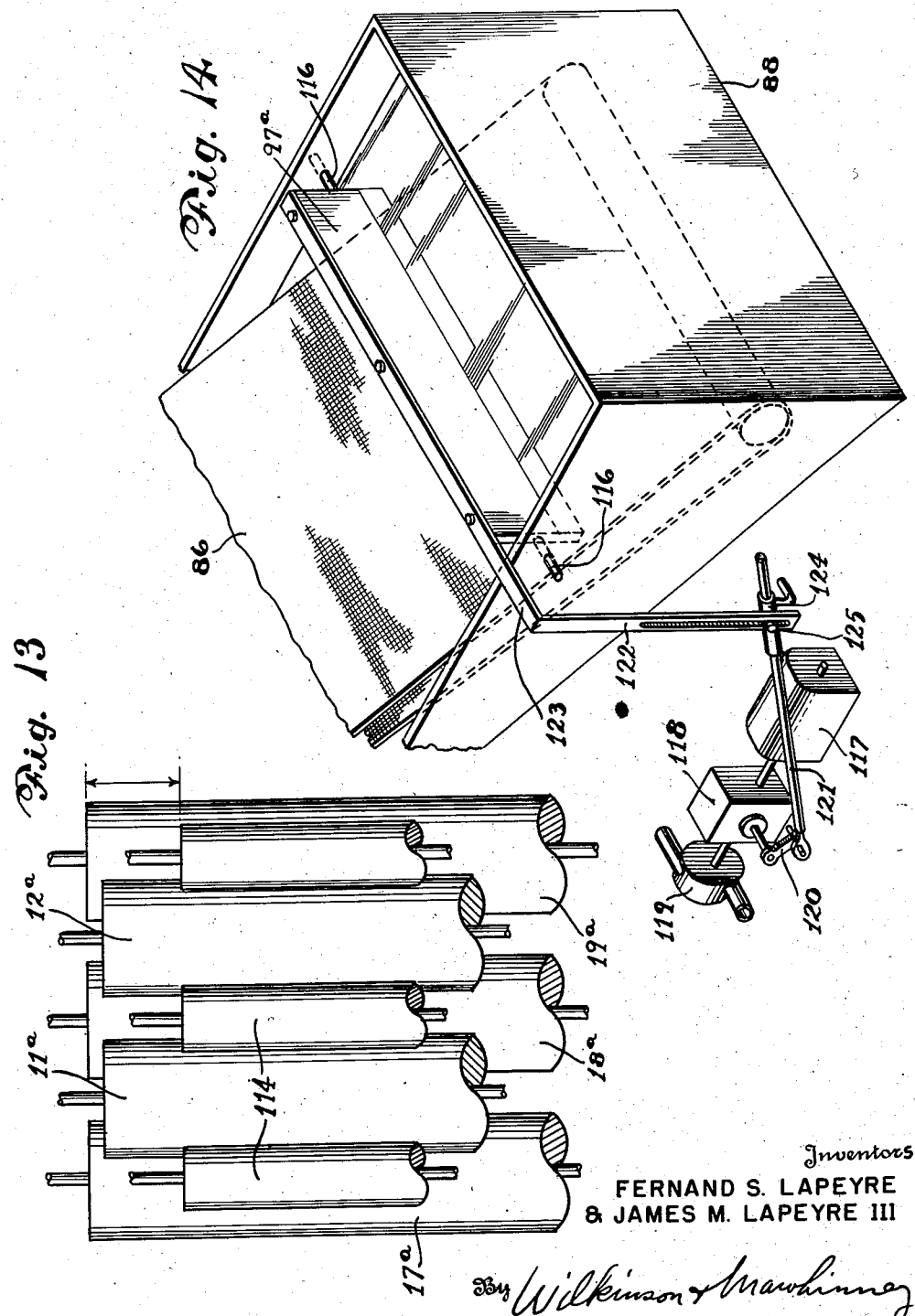
Inventors
FERNAND S. LAPEYRE
& JAMES M. LAPEYRE III Patented Nov. 6, 1951

2,574,044

UNITED STATES PATENT OFFICE 2,574,044

SHRIMP PEELING MACHINE

Fernand S. Lapeyre, New Orleans, and James M. Lapeyre, III, Houma, La., assignors to Peelers, Incorporated, Houma, La., a corporation of Louisiana Application April 1, 1946, Serial No. 658,692

19 Claims. (Cl. 17—2)

The present invention relates to improvements in shrimp peeling machines, and consists in certain improvements over the prior machine illustrated and described in our prior Patent No. 2,429,828, granted October 28, 1947.

While the present invention has in general the same objects as stated in the prior application aforesaid, the present machine offers advantages in speed and precision of peeling and in the matter of eliminating the accumulation of slime. Such slime is encountered on the top portions of the rollers and if not removed is a deterrent to proper peeling. The removal of the slime is achieved by causing the shrimp to travel along channels established between rollers while flushing the slime, resulting from the peeling, with jets of water, causing drainage to the lower ends of the rollers, which are inclined.

Unlike the machine of the prior application, the path of the shrimp is longitudinally of the rollers, the axes of which are disposed in an inclined plane, the shrimp gravitationally traveling along the length of the rollers, as against across the same as disclosed in our prior application referred to.

A further object of the invention and a further difference over the machine of the prior application lies in the arrangement of rollers in two planes, resulting in the establishment of channels along which the shrimp must travel in the course of peeling and wherein they are held and confined, the peeling taking place substantially continuously while the shrimp are on their course along the inclined channels.

An additional object, and difference over the prior machine, resides in the use of water on the upper sides of the rollers, which operates to move the shrimp along the channels at such periods of time when they have been released from the pinching and peeling action of the rollers, the oscillating motion of the rollers acting to transfer the shrimp from one side of the channel to the other in an approximately zig-zag path as the shrimp gravitationally proceed and are washed down the inclined channels.

A still further object of the invention resides in the use of jets of water to flush away the slime resulting from the peeling, along the upper sides of the rollers to the point of discharge at the lower ends.

A still further object of the invention is to control the rate of travel of the shrimp down the inclined channels by governing the volume of water supplied to the top portions of the rollers.

With the foregoing and other objects in view, the invention will be more fully described hereinafter, and will be more particularly pointed out in the claims appended hereto.

In the drawings, wherein like symbols refer to like or corresponding parts throughout the several views, Figure 1 is a side elevation of an improved shrimp peeling machine and feeder as constructed in accordance with our present invention;

Figure 2 is a plan view of one form of roller employed, with parts broken away and parts shown in section;

Figure 5 is an end elevation taken on the line 5—5 in Figure 4;

Figure 6 is an end elevation of the frame and jacking adjustable arrangement with parts broken away;

Figures 7 and 8 are diagrammatic views showing the shrimp peeling operation;

Figure 9 is a detail of the baffle adjustment;

Figure 10 is an end elevation of a modified form of drive and closed arrangement of channel;

Figure 11 is a diagram showing the method of operation of this modified form;

Figure 12 is an end elevation of one of the rollers rubber coated;

Figure 13 is a fragmentary top plan of the modified channel arrangement;

Figure 14 is a fragmentary perspective view of a modified form of movable baffle or paddle, and Figure 15 is a fragmentary perspective view of a modified form of top frame.

Figures 3, 4:
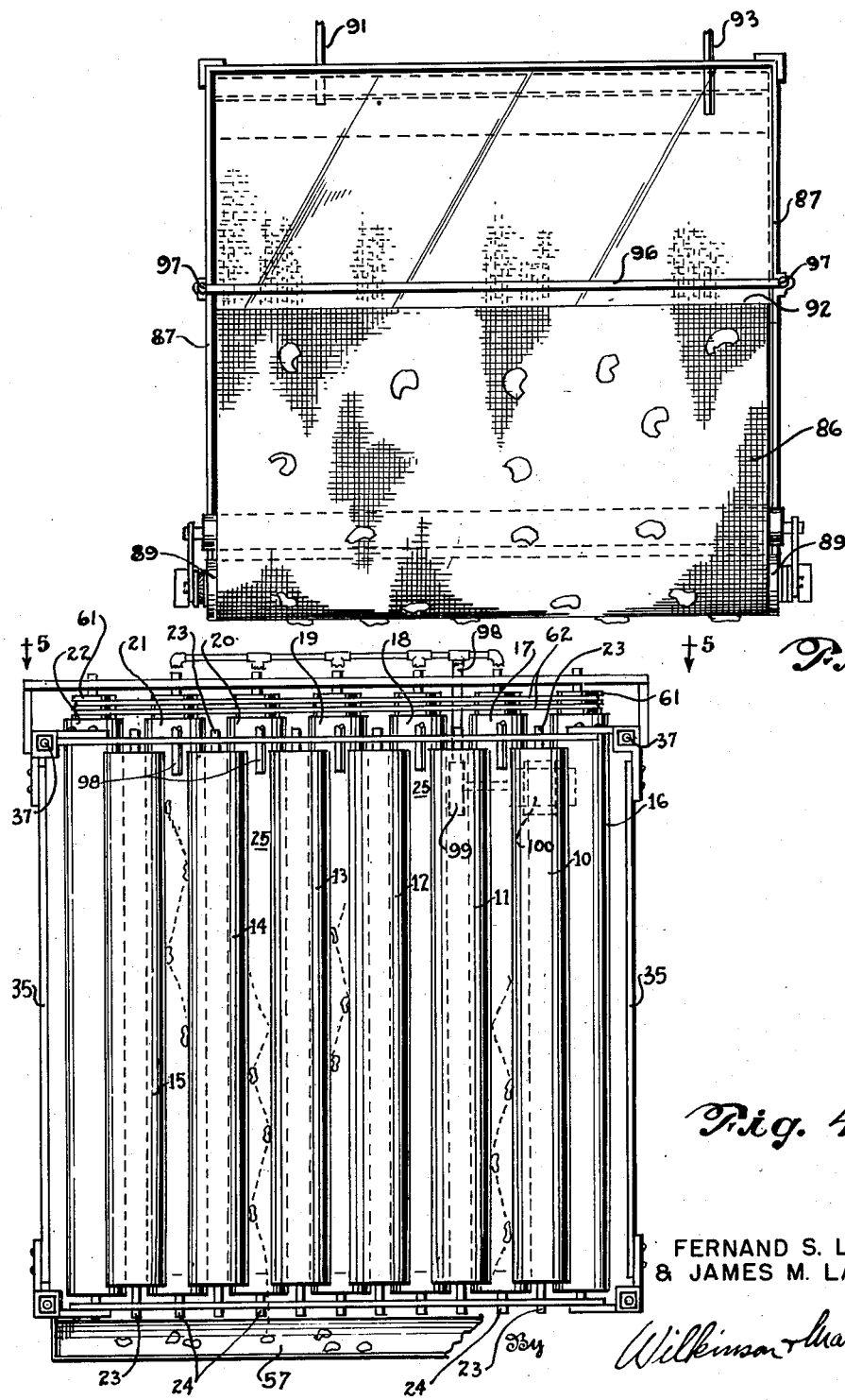
Figure 3 is a top plan view of the feeder as shown on the line 3—3 of Figure 1.
Figure 4 is a top plan view of the peeler as shown on the line 4—4 in Figure 1.

Referring more particularly to the drawings and more particularly with reference to Figure 5, a number of upper rollers 10, 11, 12, 13, 14 and 15 are illustrated as being six in number and as resting upon a series or bank of lower rollers 16, 17, 18, 19, 20, 21 and 22, which in the example shown in Figure 5 are seven in number. The axes 23 and 24 of these rollers are shown as being inclined for which see Figure 1 whereby a high or shrimp receiving end is provided with a low or discharge end.

The shrimp travels down the inclination in channels 25 between the spaced upper rollers 10–15 and supported upon the peripheries of the lower rollers 16–22. Ordinarily three rollers constitute a unit, although at any particular time the bottom or power roller and one of the upper rollers cooperates to perform the peeling function. When the lower power roller is rotating clockwise, the pinching or peeling action is secured by reason of the contact between said lower roller and the right upper roller. On the other hand, when the lower power roller is rotating counter-clockwise, the pinching or peeling action is secured by the contact between the lower roller and the left upper roller. Such unit comprises a pair of upper rollers, for instance the rollers 11, 12 as seen in Figures 7 and 8 which rollers are horizontally spaced to provide the downwardly inclined channel 25 therebetween; and such unit is completed by a single bottom roller 18 which is disposed directly beneath the channel 25. The upper rollers rest upon the lower rollers so that crotches 27, 29 are provided for each unit where the upper pair of rollers 11, 12 contact and engage with pressure upon the upper side portions of the single roller 18. Other crotches, bights or nips are shown at 28 and 30 for adjacent rollers. It will be understood that this unit of three rollers may be repeated as many times as desired. In Figure 7 it will be apparent that the upper roller 12 of the unit 11, 12, 18 also forms a member of the adjacent unit 12, 13, 19. In this way any number of inclined channels 25 may be provided for a desired capacity of machine.

As shown in Figures 7 and 8 the various rollers are adapted to be oscillated back and forth in the directions of the arrows 31 and 32. In these figures 33 represents the raw shrimp or the peeled meat in the channel 25, while the hulls or shells which pass through the crotches and are pinched from the meat are indicated at 34 as dropping through the discharge gaps 26 between adjacent lower rollers 18, 19.

In other words a unit may consist of the rollers 11, 12 and 18, the axes 23 and 24 of which are in a triangular arrangement with the base of the triangle uppermost and its apex pointed downwardly.

This arrangement provides the channels 25 which are closed at their bottoms by the lower group of rollers 17 to 21 and at both sides by the upper group of rollers 10 to 15, but are open at their top portions to receive the shrimp therein.

The rollers may be supported in any suitable manner. As an example the upper rollers 10-15 may be journaled in a top frame 35 while the lower rollers 16-22 may be journaled in a lower frame or bed 36. The top frame 35 is connected with the lower bed 36 by means of threaded rods 37 which are pivoted at 38 to the lower bed 36. Pairs of nuts 39 and 40 are run upon the threaded rods 37. These threaded rods are arranged at corner portions of the frame, and coil springs 41 are wound about the threaded rods 37 between the upper nuts 39 and abutments 42 carried by the corner braces 43 which are parts of the top frame 35. The lower nuts 40 are threaded on portions of the threaded rods 37 below the corner braces 43.

Horizontally adjustable screws 44 are threaded through blocks 45 on the lower frame or bed 36 and have heads 46 by which they may be rotated and thus shifted back and forth in the blocks 45. The inner ends of the adjusting screws 44 contact the journals or the journal blocks 58 and 59 of the end rollers 16 and 22 of the lower bank as shown in Figure 5 whereby to prevent these rollers 16 and 22 and consequently the entire assembly from spreading laterally. By adjusting these screws 44 the width of the channels 25 and gaps 26 may be diminished or enlarged in width.

As shown in Figure 5 the journals 23 of the upper rollers 10-15 are slidable in horizontally elongated slots 200 in the top frame 35 while the journal blocks 202 for the journals 24 of the lower set of rollers 16-22 slide in horizontally elongated recesses 201 made through the upper edge of the lower bed 36. When pressure is applied by the screws 44 the lower set of rollers 16-22 will be squeezed together, thus diminishing the horizontal widths of the discharge gaps 26. The upper set of rollers 10-15 will be enabled to ride up as the top frame 35 is adjustable on the rods 37. The upper set of rollers 10-15 will also be moved closer together by this action in order to lessen the widths of the channels 25. When the lower drive rollers 16-22 are moved closer together shorter cables 62 will be substituted or conventional forms of take-ups may be included in the cables for the purpose of adjusting the lengths thereof.

As shown more particularly in Figure 1, the lower bed 36 and thus the top frame 35 which is carried thereby as a unit is pivoted to the framework 50 by the pivots or studs 47 (Figure 1) whereby the entire assemblage of rollers may be adjusted as to angle of inclination. At the lower freely swinging end of such assemblage one or more screw or other jacks are placed in order to adjust the entire assemblage about the pivots 47. This jack arrangement is shown more particularly in Figures 1 and 6 in which a rod 48 on the bed 36 cooperates with a rod 49 mounted in the framework 50. A collar 51 rotates on the rod 48 and carries a jack screw 52 which is adapted to telescope into a sleeve 53. A nut 54 feeds the screw 52 into and out of the sleeve 53 thus drawing down or pushing up the lower free end of the roller assemblage. A lower collar 60 carried by the sleeve 53 is swiveled on the lower rod 49.

A drain pan 55 is carried by the bottom frame 36, such pan 55 having a hull outlet 56 disposed below a trough 57 positioned to catch the peeled meat as it emerges from the lower ends of the channels 25.

The rollers may be oscillated by any appropriate mechanism, for instance the upper set of rollers 10-15 may receive oscillatory movement from frictional contact with the lower set of rollers 16-22 which have grooved sheaves 61 affixed thereto or to their shafts at the high ends, endless cables 62 being trained through the grooves of the sheaves 61 and affixed, as indicated in Figure 5, to a sliding tube or cross head 63 mounted for reciprocation on a stationary rod 64 affixed to the framework or the drain pan 55. An arm 65 projects down from the sliding tube 63 and is pivotally connected at 66 to a link 67 pivoted at 68 to a rotary crank arm. This crank arm 69 is driven through the reduction gear 70 from the gear shaft 71 through a belt and pulley transmission 72 from the motor shaft 73 and the electric or other motor 74. An adjustment 75 (Figure 1) controls the speed of the rollers and also of the feeder by means of a vari-speed motor pulley. As shown in Figure 5 the gear shaft 71 has a pulley 76 fixed upon its outer end from which power is transmitted by a belt 77 to the shaft 78 of the feeder mechanism.

Referring more particularly to Figure 2, while it will be understood that any type or form of roller may be employed for either or both upper and lower banks of rollers, such rollers will preferably be provided with ball or roller bearings 79 running upon a non-rotary shaft 80 which may have a square or other non-circular end 81 fitted in a square or non-circular socket in a bearing 82. The bearings 82 are non-rotatably fitted in square or non-circular openings through the end rails of the upper case 35 as shown in Figures 2 and 5. The bearings 82 are flanged over at 83 and 84 at opposite sides of the rails 35 to maintain the same in place in the rails. This arrangement will also prevent axial sliding movement of the shaft 80.

Any desired feeder mechanism may be employed but preferably the mechanism shown more particularly in Figures 1 and 3 in which an endless wire mesh conveyor 86 is disposed on an inclination in a tank 87 having an inclined bottom 88, the higher end of which is disposed adjacent the high end of the inclined rollers. The conveyor 86 runs over a high roller 89 and a low roller 90.

The tank 87 is provided with fresh water through an inlet pipe 91, the water being maintained at a level 92 by means of an overflow outlet pipe 93. A clean-out valve 94 is provided near the lower inclined end of the tank 87. The lower hinged baffle 95 is mounted on the tank wall adjacent the lower conveyor roller 90 and has its free end curved in the direction of motion of the upper run of the conveyor 86 and resting thereupon. A second vertically adjustable baffle 96 is mounted approximately at the water level line 92 above an intermediate part of the upper run of the conveyor 86, the same being carried by the side tank walls and made adjustable by nuts 97 or other appropriate means.

In the operation, the shrimp are dumped or shoveled into the water vat 87 which is open at the top for this purpose. Such shrimp are picked up by the feeder belt 86 and carried upwardly therealong as indicated in Figure 1 by which they are dropped into the upper or high end of the peeling machine. At this point they find their way into the inclined channels 25 and rest upon the lower rollers 16-22 which, being given an oscillatory motion by the driving mechanism, present the shrimp alternately to each of its two upper rollers. Thus the shrimp are brought alternately into contact with opposed crotches. As the mutual peripheries of the two rollers constituting a crotch move downwardly together they squeeze and pinch the shrimp forcing the meat 33 out of the hulls. The meat being slippery does not pass through the crotch. However the shells or hulls are caught by the peripheries of the rollers and having been evacuated of the meat are flattened and are thus subject to passage through such crotches and into the discharge gaps 26 below. These hulls 34 fall into the drain pan 55 and are evacuated through the hull outlet 56.

On the reversal of rotation of any pair of rollers the shrimp is driven back from the crotch, being carried by this reversal of rotation of the lower roller across to the opposite crotch. As soon as the shrimp is released at one crotch and is being transferred to the other crotch the shrimp advances down the channel 25 aided partly by gravity and partly by the flow of water received through the pipes 98 (Figure 4). Water may be supplied to the pipes 98 by a pump 99 driven by motor 100 (Figure 5).

As shown in Figure 4 by the dotted lines the shrimp passes down the channels in a substantially zig-zag manner alternately moving from one crotch to an opposed crotch in accordance with the alternating movements of the rollers. If not previously peeled at one crotch the shrimp is engaged again and again as it descends the channel until peeling is completed, after which the shrimp continues its course along the channel to the lower end point where the meat is discharged.

Thus the shrimp is presented a number of times to the opposed crotches and each time its position with relation to the crotch changes whereby it is sure to be a number of times advantageously presented in a proper relation to the peeling rollers for complete peeling operation.

Pipes 101 also supplied with water from an appropriate source may run longitudinally of the discharge gaps 26 with slots or perforations 102 and 103 directed upwardly toward the crotches. This water flushes the removed hulls away from the rollers and down into the drain pan. It also tends to keep the rollers free of slime. The flushing of water through the pipes 98 in the upper channels 25 also tends to wash down the slime and keep the surfaces of the rollers clean and free from such slime. The rate of the travel of the shrimp down the channels 25 may be controlled by the volume and force of the water supplied through the pipes 98.

The adjustable baffle 96 is placed above the mesh conveyor to control the quantity of shrimp allowed to be advanced by the belt to the peeling machine. The lower edge of the baffle 96 will always be spaced above the upper run of the mesh conveyor 86.

A take-up roller 104 is engaged with a part of the conveyor 86, this roller being adjustable in the usual manner in order to keep the conveyor appropriately taut.

The nuts 39 may be tightened to increase the tension between the lower and the upper rollers. By running these upper nuts 39 down upon the rods 37, the coil springs 41 are compressed thus urging the top roller frame and the rollers 10-15 journaled therein downwardly by the amount of this compression. This force is added to that of gravity. The lower nuts 40 are run downwardly away from the bottom of the top frame or corner braces 43 when the machine is being used. When the machine is no longer to be kept in use these lower nuts 40 are run up against the bottom of the top frame causing the frame to ride up on the springs 41 and compress the same, thus relieving pressure between the rollers. The stop bolts 44 will prevent spread of the end rollers. In other words the lower end rollers 16 and 22 are prevented from moving outward by these adjustable stop bolts 44 acting against the stationary roller shafts. These bolts 44 also permit adjustment to obtain various spacing between the lower rollers. The upper rollers are held in place by the tension between the upper and lower rollers.

The shafts of the lower rollers simply rest on the lower frame or bed. Only the central lower roller is locked in position against horizontal shifting in either direction.

The shafts of the upper rollers are slidably housed in partly closed channel supporting frames which permits the raising of the upper rollers to remove tension between the lower and upper rollers when the machine is not in use.

Referring more particularly to Figure 15 in which a modified form of case frame 35ª is shown, such frame is shown to be of channel form closed on its inner side by walls 204 and 205 except for the provision of a horizontally elongated slot 203 formed between the edges of the inner walls 204 and 205. The journals 23ª of the upper roller shafts 10ª, etc., are rotatably and slidably mounted in the slot 203. When the top frame 35ᵃ is lifted the top bank of rollers 10ᵃ, etc., will be lifted from the frame as for instance when the nuts 40 of Figure 5 are run upwardly; and also when the upper adjusting nuts 39 are removed from the threaded rods 37 and the entire upper frame lifted to remove tension from the upper bank of rolls.

Referring to Figure 9, a form of baffle adjustment is illustrated in which perforated lugs 105 on the baffle 96 overhang the outside walls of the vat 87 above external stationary abutments 108 in which are affixed the screws 106 having the nuts 97 and 107. By screwing down nuts 107 the baffle 96 may be lowered and by screwing the nuts 107 up the baffle 96 is raised. Nuts 97 act as lock nuts to secure the adjustment once made. Any other form of adjusting device may be employed.

Referring more particularly to Figure 10, a modification is shown in which the cable drive is replaced by a rack and pinions to furnish the same oscillating motion to the rollers. The rack 110 meshes with pinions 111 affixed to the upper ends of the lower rollers 16a, 17a, 18a, 19a, 20a, 21a and 22a. The rack 110 meshes with these pinions 11 on the lower sides. The rack 110 is affixed to the arm 65a which receives a reciprocating motion from the link 67a and from the rotary crank 69a.

For economic reasons and to obtain added capacity from the machine two end rollers 112 and 113 (Figure 10) have been added to the upper bank of rollers. These two additional rollers 112 and 113 give two additional channels without adding any further rollers to the lower bank.

Our experiments have shown that best performance is secured where all of the lower rollers 16a–22a are fixed as far as lateral movement is concerned. In Figure 5 only the central lower roller 19 is fixed. However in Figure 10 all of the lower rollers are fixed against any horizontal relative movement.

Our experiments likewise have shown it desirable to install idler rollers 114 above each of the channels as shown in Figures 10 and 11. In Figure 13 these idler rollers 114 are shown as shorter than the operating rollers but of sufficient length to provide open mouths at the upper high ends of the roller banks to allow the shrimp to enter the channels. The object of these idler rollers 114 is to permit the use of a greater volume of water under great force from above so as to accomplish the more thorough cleansing of the rollers, thereby permitting more precise peeling. These idler rollers 114, which are relatively small in diameter ride on the upper arcs of the rollers of the upper bank as shown in Figures 10, 11 and 13.

Referring more particularly to Figure 12, one of the rollers 19ᵃ is shown as representative of the rollers of both upper and lower banks, this roller having a covering 115 of rubber or the like which we find at the present time the best surfacing for the rollers as the same relates to the shrimp peeling operation.

Referring more particularly to Figure 14, a modified form of baffle 97a is shown in the feeder tank as oscillating upon trunnions 116 which project out intermediate the ends of the baffle to permit such baffle to execute an oscillating motion. In effect the baffle is a paddle and moves in a small arc which creates a wave motion, which in turn delivers the shrimp more efficiently onto the moving conveyor 86. This paddle may secure its power from an independent motor or from the peeler power unit. In Figure 14, a motor 117 drives a speed reducer 118 and a pump 119. The speed reducer rotates the crank 120, for instance at 120 R. P. M. in a circle of approximately five inch diameter. The crank reciprocates a pitman 121 which is connected to an arm 122 having a horizontal extension 123 affixed along the upper edge of the paddle 97a. An adjustment 124 provides for shifting the pivotal connection 125 between the pitman and arm so as to change the effective leverage or radius of operation.

It is obvious that various changes and modifications may be made in the details of construction and design of the above specifically described embodiment of this invention without departing from the spirit thereof, such changes and modifications being restricted only by the scope of the following claims.

What is claimed is:

1. In a shrimp peeling machine, a unit arrangement of three axially inclined oscillating rollers with two of the rollers spaced apart and with the third roller disposed below such space and forming crotches with the spaced rollers, the assembly thus forming a channel to which raw shrimp may be fed for peeling.

2. In a shrimp peeling machine, a unit arrangement of two rollers with their axes inclined and a crotch between the rollers adapted to peel shrimp, and means for oscillating said rollers.

3. In a shrimp peeling machine, a unit arrangement of three rollers, two of said rollers constituting an upper pair and being spaced apart in a substantially horizontal sense, the third single lower roller being disposed below the space between the upper rollers and forming with such upper rollers two spaced crotches for the peeling of the shrimp, said rollers being axially inclined and having a higher receiving end for shrimp and a lower discharge end, and means for oscillating said rollers in such wise that the peripheries of the crotch portions move together in the same directions with alternation of direction in the opposed crotches.

4. A shrimp peeling machine as claimed in claim 3, wherein means are provided to deliver a current of water in a channel defined by the three rollers to assist the shrimp in moving gravitationally from the higher to the lower ends of the rollers.

5. In a shrimp peeling machine, a unitary arrangement of three rollers axially inclined from a high receiving to a low discharge end and with the axes of the rollers in a relative triangular relation with the base disposed upwardly and the apex downwardly and with the two upper rollers spaced apart substantially horizontally and contacting side portions of the lower apex roller to form an inclined channel between the three rollers, means to deliver shrimp to the high end of the rollers, a receiver for the shrimp at the lower ends of the rollers, and means to oscillate said rollers.

6. A shrimp peeling machine as claimed in claim 5 wherein means is provided to deliver a stream of water at or about the high end of the channel to assist in moving the shrimp down such channel longitudinally of the rollers and in a substantially zig-zag path as required by the oscillatory movement of such rollers.

7. A shrimp peeling machine as claimed in claim 5 characterized by the fact that the unitary arrangement is mounted for pivoting movement in the frame of the machine, and means are provided for adjusting such unitary arrangement to change the angle of inclination of such rollers.

8. A shrimp peeling machine as claimed in claim 5 in which the unitary arrangement of rollers is pivoted at its upper portion in the frame of the machine, and screw jacks are disposed beneath the unitary arrangement at the low portion thereof to raise or lower such low portion and rotate the unitary arrangement about the framework in order to vary the inclination of the rollers to the horizontal.

9. A shrimp peeling machine as claimed in claim 5 wherein a bed is provided for the loose journalling of the lower rollers and a frame above such bed in which are journalled the upper rollers, with means to yieldingly press the frame down upon such bed.

10. A shrimp peeling machine as claimed in claim 5 in which means are provided for taking up the axial thrust of said rollers and substantially preventing lateral movement thereof.

11. A shrimp peeling machine as claimed in claim 5 in which the means for oscillating the rollers comprise a grooved drum, a cable trained frictionally through said drum, and means for imparting a reciprocating movement to said cable.

12. An improved shrimp peeling machine comprising upper and lower rollers arranged on an axial inclination and having a channel therebetween, means for oscillating said rollers, means for supplying water to the channels at the upper portion thereof, means for receiving the peeled meat from the lower end portions of the channels, a drain pan below the rollers for receiving the hulls, said drain pan having a hull outlet.

13. An improved shrimp peeling machine comprising upper and lower rollers set on an axial inclination and having a channel therebetween for receiving shrimp, means for oscillating said rollers comprising sheaves affixed to said rollers, a cable running over said sheaves, a reciprocating cross head connected to said cable, and means for moving said cross head back and forth.

14. An improved shrimp peeling machine comprising an upper set of cylindrical rollers having channels for the shrimp therebetween, a lower set of cylindrical rollers placed beneath said channels, the rollers being set on an axial inclination, an upper frame in which the upper rollers are journaled, a lower frame in which the lower rollers are journaled, threaded tension rods passing freely through the upper frame and pivoted to the lower frame, coil springs on the rods resting on the upper part of the upper frame, upper nuts threaded on the rods above the springs, and lower nuts threaded on the rods below the upper frame.

15. An improved shrimp peeling machine comprising a bank of horizontally spaced axially inclined upper rollers, a lower bank of horizontally spaced axially inclined rollers staggered in position with respect to the upper rollers and having a lower roller positioned beneath the space between the upper rollers with two end lower rollers contacting and extending laterally beyond the two end rollers of the upper bank, and adjustable means to prevent spreading of said end rollers and to adjust the same horizontally.

16. An improved shrimp peeling machine comprising upper and lower inclined frames, an upper bank of rollers journaled in the upper frame in horizontally spaced relation, a bank of lower rollers freely mounted upon the lower frame to move horizontally toward and from one another with the exception of the center roller which is fixed, the upper rollers bearing upon two lower rollers, and means to engage the end rollers of the lower bank to prevent the lateral spreading of these rollers due to the incumbent weight of the upper frame and upper bank and to adjust the gaps between the lower rollers, and means for oscillating said rollers.

17. A shrimp peeling machine as claimed in claim 1, wherein means are provided to deliver a stream of water against the undersides of the rollers to flush the shrimp hulls from the same.

18. A shrimp peeling machine according to claim 1 in which a rack and pinion drive is employed for the lower roller, the upper rollers deriving drive from contact with the lower roller.

19. A shrimp peeling machine as claimed in claim 1 in which an idler roller closes the upper portion of said channel.

FERNAND S. LAPEYRE.
JAMES M. LAPEYRE, III

REFERENCES CITED

The following references are of record in the file of this patent:

UNITED STATES PATENTS

| Number | Name | Date |
|---|---|---|
| 311,199 | Moulton | Jan. 27, 1885 |
| 1,011,378 | Shaffer | Dec. 12, 1911 |
| 1,852,405 | Farley | Apr. 5, 1932 |
| 2,109,703 | Maiers | Mar. 1, 1938 |
| 2,147,633 | Bottker | Feb. 21, 1939 |
| 2,263,697 | Grayson | Nov. 25, 1941 |
| 2,380,264 | Richardson | July 10, 1945 |

FOREIGN PATENTS

| Number | Country | Date |
|---|---|---|
| 27,351 | Norway | Oct. 16, 1916 |